US012792383B2

(12) United States Patent
Yabusaki

(10) Patent No.: US 12,792,383 B2
(45) Date of Patent: Nov. 10, 2026

(54) MULTI-TIER CLUSTER CONTROL APPARATUS, MULTI-TIER CLUSTER CONTROL METHOD, AND NON-TRANSITORY COMPUTER READABLE MEDIUM

(71) Applicant: Hitachi, Ltd., Tokyo (JP)

(72) Inventor: Hitoshi Yabusaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 515 days.

(21) Appl. No.: 18/469,385

(22) Filed: Sep. 18, 2023

(65) Prior Publication Data

US 2024/0241745 A1 Jul. 18, 2024

(30) Foreign Application Priority Data

Jan. 18, 2023 (JP) ................................ 2023-005685

(51) Int. Cl.
*G06F 9/45* (2006.01)
*G06F 9/455* (2018.01)

(52) U.S. Cl.
CPC .. *G06F 9/45558* (2013.01); *G06F 2009/4557* (2013.01)

(58) Field of Classification Search
CPC ..................... G06F 9/45558; G06F 2009/4557
USPC .............................................................. 718/1
See application file for complete search history.

(56) References Cited

U.S. PATENT DOCUMENTS

| | | | | |
|---|---|---|---|---|
| 8,478,878 | B2 | 7/2013 | Freimuth et al. | |
| 2010/0138818 | A1* | 6/2010 | Harrop | G06F 8/61 717/174 |
| 2013/0198424 | A1* | 8/2013 | Randhawa | G06F 13/385 710/74 |
| 2015/0378765 | A1* | 12/2015 | Singh | G06F 3/0482 718/1 |
| 2016/0127440 | A1* | 5/2016 | Gordon | H04L 65/612 709/219 |
| 2018/0135993 | A1* | 5/2018 | Thangaraj | H04L 67/52 |
| 2019/0235978 | A1* | 8/2019 | Wu | G06F 11/2023 |
| 2020/0236010 | A1* | 7/2020 | Kottapalli | H04L 41/0893 |
| 2020/0311077 | A1* | 10/2020 | Zhang | G06F 3/068 |
| 2020/0342297 | A1* | 10/2020 | Dai | G06N 3/0464 |
| 2021/0406088 | A1* | 12/2021 | Chen | G06F 9/547 |
| 2022/0147517 | A1 | 5/2022 | Rupprecht et al. | |

(Continued)

*Primary Examiner* — Tuan C Dao
(74) *Attorney, Agent, or Firm* — Procopio, Cory, Hargreaves & Savitch LLP

(57) ABSTRACT

A multi-tier cluster control apparatus is configured to: accept, when deploying processing clusters, with respect to each of the plurality of processing clusters, deployment request information including a requirement for a processing cluster node and a designation of a related cluster; specify, based on the requirement for the processing cluster node and a requirement for a processing cluster node that configures the related cluster, a container cluster node that conforms to the requirements; transmit node specific information that indicates the specified container cluster node as cluster policy information; specify a placement group that runs on a container cluster node within a predetermined range from a container cluster node on which the processing cluster nodes of the processing cluster and the related cluster run; and transmit information on the placement group to the processing cluster as process policy information.

20 Claims, 16 Drawing Sheets

(56) References Cited

U.S. PATENT DOCUMENTS

| | | | | |
|---|---|---|---|---|
| 2023/0281054 | A1* | 9/2023 | Baxter | G06F 9/44526<br>718/105 |
| 2024/0220639 | A1* | 7/2024 | Sahu | G06F 21/602 |

* cited by examiner

FIG. 2

2100

```
Name:           k8s-node00
 Roles:         worker
 Labels:
   kubernetes.io/arch=amd64
   kubernetes.io/hostname=k8s-node00
   kubernetes.io/os=linux
   gpu="true"
    pool-hetero-stuck-id= [50acd0ce-9b9a-4438-ab6a-a64f4656165c]
     availability-zone=us-east-1a
Annotations:
CreationTimestamp:  Fri, 08 Apr 2022 03:08:01 +0000
                       .
                       .
                       .
Conditions:
  Type                    Status
  NetworkUnavailable   False
   MemoryPressure       False
  KubeletHasNoDiskPressure     False
  PIDPressure          False
  KubeletReady         True

Addresses:
  InternalIP:  192.168.0.6
  Hostname:    k8s-node00

Capacity:
  cpu:             4
  ephemeral-storage:  40470732Ki
   hugepages-1Gi:     0
  Hugepages-2Mi:      0
  memory:           16397476Ki
  pods:            110
Allocatable:
  cpu:             3900m
  ephemeral-storage:  37297826550
   hugepages-1Gi:     0
  hugepages-2Mi:      0
  memory:           16032932Ki
  pods:            110

System Info:
  Machine ID:          bdac46dec15046d7bd70b642b80b3229
                          .
                          .
                          .

 Non-terminated Pods:        (20 in total)
  Namespace              Name                                  CPU Requests  CPU Limits    Memory Requests  Memory Limits  Age
---------             ----                                ------------  ----------    ---------------  -------------  ---
default              raycluster-autoscaler-head-n29df              756m (19%)    8500m (217%)  380Mi (2%)       8704Mi (55%)   41d
               ingress-nginx          ingress-nginx-controller-55dcf56b68-mccjm        100m (2%)    0 (0%)      90Mi (0%)      0 (0%)       40d
                          .
                          .

Allocated resources:
                                                        (Total limits may be over 100 percent, i.e., overcommitted.)
Resource          Requests        Limits
--------          --------        ------
cpu            1917m (49%)      13900m (356%)
memory           2294290Ki (14%)  14616Mi (93%)
                          .
                          .

Events:          <none>                                                      ubuntu@iac3:~$
```

FIG. 3

2200(2200-1)

```
apiVersion: cluster.ray.io/v1
kind: RayCluster
metadata:
  name: cluter1
  annotations:
  - pool-hetero-stuck : "{ 'related-services': ['kafka', 'knative',
'influx'], 'node_preferrence' : {'gpu-support': "true', 'required': false}, 'cluster_size':
{'min':3, 'max': 10}, 'resources':  {'limit': {'cpu': 1, 'memory': '1GiB'}, request: {'cpu':
0.5, 'memory': '200MiB'}}}"
spec:
  headServicePorts:
    - name: client
      port: 10001
      targetPort: 10001
    - name: ray-serve
      port: 8000
      targetPort: 8000
  podTypes:
  - name: head-node
    podConfig:
      apiVersion: v1
      kind: Pod
      metadata:
        generateName: ray-head-
      spec:
        volumes:
        - name: dshm
          emptyDir:
            medium: Memory
        containers:
        - name: ray-node
          imagePullPolicy: Always
          image: rayproject/ray:latest
          ports:
          - containerPort: 6379
          volumeMounts:
          - mountPath: /dev/shm
            name: dshm
  - name: worker-node
    podConfig:
      apiVersion: v1
      kind: Pod
      metadata:
        generateName: ray-worker-
      spec:
        volumes:
        - name: dshm
          emptyDir:
            medium: Memory
        containers:
        - name: ray-node
          volumeMounts:
          - mountPath: /dev/shm
            name: dshm
                  env:
                  - name: MY_NODE_NAME
                    valueFrom:
                      fieldRef:
                        fieldPath: spec.nodeName
         ...
```

FIG. 4

2200(2200-2)

```
kind: Deployment
apiVersion: extensions/v1beta1
metadata:
  name: kafka-deployment
  annotations:
  - pool-hetero-stuck : "{ 'related-services': ['ray', 'knative', 'influx']}, 'cluster_size': {'min':3, 'max':
10}, 'resources':  {'limit': {'cpu': 0.5, 'memory': '2GiB'}, request: {'cpu': 0.5, 'memory': '500MiB'}}}"
spec:
  replicas: 1
  selector:
    matchLabels:
      name: kafka
  template:
    metadata:
      labels:
        name: kafka
        app: kafka
    spec:
      containers:
      - name: kafka
        image: wurstmeister/kafka
        ports:
        - containerPort: 9092
          env:
          - name: KAFKA_ADVERTISED_PORT
            value: "9092"
          - name: KAFKA_ADVERTISED_HOST_NAME
            value: [LOADBALANCER_DNS_GOES_HERE]
          - name: KAFKA_ZOOKEEPER_CONNECT
            value: zoo1:2181,zoo2:2181,zoo3:2181
          - name: KAFKA_CREATE_TOPICS
            value: mytopic:2:1
```

FIG. 5

2300(2300-1)

```
apiVersion: cluster.ray.io/v1
kind: RayCluster
metadata:
  name: cluter1
  annotations:
    - pool-hetero-stuck : "{ 'related_services': ['kafka', 'knative',
'influx'], 'node-preferrence' : {'gpu-support': 'true', 'required': true},
'cluster_size': {'min':3, 'max': 10}, 'resources': {'limit': {'cpu':
1, 'memory': '1GiB'}, request: {'cpu': 0.5, 'memory': '200MiB'}}}"

spec:
  headServicePorts:
      .
      .
      .
- name: head-node
  podConfig:
    apiVersion: v1
    kind: Pod
    metadata:
      generateName: ray-head-
    spec:
          affinity:
            nodeAffinity:
              requiredDuringSchedulingIgnoredDuringExecution:
                nodeSelectorTerms:
                  matchExpressions :
                  - key: pool-hetero-stuck-id
                    operator: In
                    values:
                     - 50acd0ce-9b9a-4438-ab6a-a64f4656165c
              preferredDuringSchedulingIgnoredDuringExecution:
              - weight: 10
                preference:
                matchExpressions:
                - key: gpu-support
                  operator: In
                  values:
                  - "true"
        volumes:
          .
          .
          .
        - name: dshm
          .
          .
          .
- name: worker-node
    podConfig:
      apiVersion: v1
      kind: Pod
      metadata:
        generateName: ray-worker-
      spec:
          affinity:
            nodeAffinity:
              requiredDuringSchedulingIgnoredDuringExecution:
                nodeSelectorTerms:
                  matchExpressions :
                  - key: pool-hetero-stuck
                    operator: In
                    values:
                     - 50acd0ce-9b9a-4438-ab6a-a64f4656165c
        preferredDuringSchedulingIgnoredDuringExecution:
        - weight: 10
          preference:
          matchExpressions:
          - key: gpu-support
            operator: In
            values:
            - "true"
        volumes:
            .
            .
            .
```

2301-1

2301-2

FIG. 6

2300(2300-2)

```
kind: Deployment
apiVersion: extensions/v1beta1
metadata:
  name: kafka-deployment
 annotations:
  - pool-hetero-stuck : "{ 'related_services': ['ray', 'knative', 'influx']}, 'cluster_size': {'min':3, 'max': 5},
'resources':  {'limit': {'cpu': 1, 'memory': '2GiB'}, request: {'cpu': 0.5, 'memory': '500MiB'}}}"
spec:
  replicas: 1
  selector:
    matchLabels:
      name: kafka
  template:
    metadata:
      labels:
        name: kafka
        app: kafka
    spec:
      affinity:
        nodeAffinity:
          requiredDuringSchedulingIgnoredDuringExecution:
            nodeSelectorTerms:
              matchExpressions :
              - key: pool-hetero-stuck-id
                operator: In
                values:
                - 50acd0ce-9b9a-4438-ab6a-a64f4656165c
      containers:
      - name: kafka
        image: wurstmeister/kafka
        ports:
        - containerPort: 9092
          env:
          - name: KAFKA_ADVERTISED_PORT
            value: "9092"
          - name: KAFKA_ADVERTISED_HOST_NAME
            value: [LOADBALANCER_DNS_GOES_HERE]
          - name: KAFKA_ZOOKEEPER_CONNECT
            value: zoo1:2181,zoo2:2181,zoo3:2181
          - name: KAFKA_CREATE_TOPICS
            value: mytopic:2:1
```

2302-1

FIG. 7

1400

| cluster-id (1401) | cluster node id (1402) | machine id (1403) | pod name (1404) |
|---|---|---|---|
| ca9abf2e-7b61-42bc-a5e4-44ddc99dcf4d | a5e4-44dd | bdac46dec15046d7bd70b642b80b3229 | ray-cluster-01 |
| ca9abf2e-7b61-42bc-a5e4-44ddc99dcf4d | 12e4-43dd | 2ddc56dec15036d7bd70b642b80b1299 | ray-cluster-02 |
| ... | ... | ... | ... |

FIG. 8

1500

1501 1502 1503

| cluster-id | process id | cluster node id |
| --- | --- | --- |
| ca9abf2e-7b61-42bc-a5e4-44ddc99dcf4d | 15e4-44d3 | a5e4-44dd |
| ca9abf2e-7b61-42bc-a5e4-44ddc99dcf4d | 25e4-44e1 | 12e4-43dd |
| ... | ... | ... |

FIG. 9

1600

| pool-id (1601) | cluster-id (1602) | related cluster id (1603) |
|---|---|---|
| 50acd0ce-9b9a-4438-ab6a-a64f4656165c | ca9abf2e-7b61-42bc-a5e4-44ddc99dcf4d | c66c9e71-fe6b-4126-8c8e-6e034f65ea03 |
| 50acd0ce-9b9a-4438-ab6a-a64f4656165c | c66c9e71-fe6b-4126-8c8e-6e034f65ea03 | ca9abf2e-7b61-42bc-a5e4-44ddc99dcf4d |
| ... | ... | ... |

FIG. 10

1700

| pool-id | machine id |
| --- | --- |
| 50acd0ce-9b9a-4438-ab6a-a64f4656165c | bdac46dec15046d7bd70b642b80b3229 |
| a3c06bc9-4dd0-49c1-a6a5-9245720ae4d2 | 2bk46dec15046d7bd70b642b80b32291 |
| ... | ... |

1701 1702

FIG. 11

1800

| Cluster-id (1801) | Cluster name (1802) | Cluster node id (1803) | Placement-group (1804) |
|---|---|---|---|
| ca9abf2e-7b61-42bc-a5e4-44ddc99dcf4d | Ray-cluster1 | a5e4-44dd | group1 |
| ca9abf2e-7b61-42bc-a5e4-44ddc99dcf4d | Ray-cluster1 | 12e4-43dd | group1 |
| c66c9e71-fe6b-4126-8c8e-6e034f65ea03 | Kafka-cluster1 | 99e4-12ac | group2 |
| ... | ... | | ... |

MULTI-TIER CLUSTER CONTROL APPARATUS, MULTI-TIER CLUSTER CONTROL METHOD, AND NON-TRANSITORY COMPUTER READABLE MEDIUM

CROSS-REFERENCE TO PRIOR APPLICATION

This application relates to and claims the benefit of priority from Japanese Patent Application No. 2023-5685 filed on Jan. 18, 2023, the entire disclosure of which is incorporated herein by reference.

BACKGROUND

The present disclosure relates to a technique for controlling a placement of a processing cluster configured on a container cluster that provides a container.

In recent years, in application systems that run on the cloud or at data centers, there has been an increasing number of cases of development using a container that is a virtual environment created by separating a process of an OS (Operating System) in use of a namespace technique. In addition, as applications, more and more microservice architectures which are configured with a plurality of containers, and which perform data communication between containers, and moreover which process received requests, are used. There are more and more cases which use, in order to run and manage a plurality of containers, container clusters such as Kubernetes (registered trademark) and the like which use a plurality of VMs (virtual machines) and servers and which have scalability and resilience.

In addition, with increased usage of AI (Artificial Intelligence) and big data analysis, there is a growing demand to run applications on a container cluster to perform analyses. In order to perform analyses in a scalable manner, more and more clusters for analytics such as Apache (registered trademark) Ray, which executes an analytical process using a plurality of nodes, are used.

A container cluster may be configured so as to straddle a plurality of availability zones for the purpose of attaining HA (High-availability) or the like. In such cases, communication between containers is to be performed across availability zones and a problem of increased communication costs arises.

For example, techniques related to the problem described above are disclosed in U.S. Patent Application Publication No. 2022/0147517 and U.S. Pat. No. 8,478,878.

U.S. Patent Application Publication No. 2022/0147517 describes a method including: receiving a manifest for a container image of a container to be created; identifying a mapping index for a cluster of computing nodes; and selecting a computing node within the cluster of computing nodes to create the container, based on a comparison of the manifest and the mapping index.

U.S. Pat. No. 8,478,878 discloses "A method, an information processing system, and a computer program product manage server placement of virtual machines in an operating environment. A mapping of each virtual machine in a plurality of virtual machines to at least one server in a set of servers is determined. The mapping substantially satisfies a set of primary constraints associated with the set of servers. A plurality of virtual machine clusters are created. Each virtual machine cluster includes a set of virtual machines from the plurality of virtual machines. A server placement of one virtual machine in a cluster is interchangeable with a server placement of another virtual machine in the same cluster while satisfying a set of primary constraints. A server placement of the set of virtual machines within each virtual machine on at least one mapped server is generated for each cluster. The server placement substantially satisfies a set of secondary constraints."

SUMMARY

In the technique described in U.S. Patent Application Publication No. 2022/0147517, a node to create a container is selected in consideration of a container image that represents contents of the container. Accordingly, communication cost required to migrate a large-capacity container can be reduced. In addition, in U.S. Pat. No. 8,478,878, communication cost can be reduced by changing a placement of VMs in consideration of constraints.

However, these techniques are unable to reduce communication cost in a system configuration involving assembling a cluster on a container cluster. For example, when configuring a cluster for analytics (hereinafter, referred to as a higher-level cluster) such as in Ray on a container cluster (hereinafter, referred to as a lower-level cluster) such as in Kubernetes, while in the lower-level cluster, which node of the lower-level cluster a container, i.e., a node of the higher-level cluster, runs on are managed, which container contents of a node of the higher-level cluster, i.e., an application process or an analytical process of the higher-level cluster, runs on are not managed. On the other hand, while in the higher-level cluster, which process runs on which node among a plurality of nodes of the higher-level cluster that operate as a container, are managed, which node of the lower-level cluster a container, i.e., a node of the higher-level cluster, runs on are not managed. As a result, when a plurality of higher-level clusters run on a lower-level cluster and attempt to create a communication coupling, the higher-level clusters are not cognizant of relative positional relationships of respective processes and data.

Furthermore, a container is deployed to a worker node that satisfies constraints upon restarting a container after a process stops or when a CPU (Central Processing Unit) of a running node becomes insufficient or upon an initial deployment of the container. Since data of each container is stored as a persistent volume and each container is virtualized, a higher-level cluster need not be aware of lower-level clusters and is not cognizant of a change to the node of the lower-level cluster on which the container runs.

As a result, an optimal position of a container of a higher-level cluster and an optimal process position within the higher-level cluster for reduction in communication cost between higher-level clusters are unknown. Therefore, even when containers of two different higher-level clusters run on a node of a same lower-level cluster or a nearby lower-level cluster, depending on the circumstances, a container may end up being placed and a process may end up running on a node of a different or a distant lower-level cluster. In such cases, an amount of long-distance communication between the higher-level clusters becomes extremely large and, additionally, response time increases.

The present disclosure has been made in consideration of the circumstances described above and an object thereof is to provide a technique that enables nodes of a plurality of clusters that run on a container cluster to be placed in an appropriate manner.

In order to achieve the object described above, a multi-tier cluster control apparatus according to one aspect is a multi-tier cluster control apparatus controlling a plurality of processing clusters to run on a container cluster. The multi-tier cluster control apparatus includes a processor, wherein the processor is configured to: accept, when deploying the processing clusters, with respect to each of the plurality of processing clusters, deployment request information including a requirement for a processing cluster node that configures the processing cluster and a designation of a related cluster, which is another processing cluster having a coupling relationship with the processing cluster; specify, based on the requirement for the processing cluster node and a requirement for a processing cluster node that configures the related cluster, one or more container cluster nodes, which are a node of a container cluster that conforms to the requirements; transmit node specific information that indicates the specified container cluster node to the container cluster as cluster policy information for determining a container cluster node to which the processing cluster is to be deployed in the container cluster; specify one or more placement groups, which are groups of processing cluster nodes that run on a container cluster node within a predetermined range from a container cluster node on which the processing cluster node of the processing cluster and the processing cluster node of the related cluster run; and transmit information on the specified placement group to the processing cluster as process policy information for determining a processing cluster node to deploy a process.

BRIEF DESCRIPTION OF THE DRAWINGS

FIG. 2 is a diagram illustrating a configuration example of node information of a lower-level cluster according to the embodiment;

FIG. 3 is a diagram illustrating an example of cluster deployment request information according to the embodiment;

FIG. 4 is a diagram illustrating another example of cluster deployment request information according to the embodiment;

FIG. 5 is a diagram illustrating an example of a cluster deployment manifest according to the embodiment;

FIG. 6 is a diagram illustrating another example of a cluster deployment manifest according to the embodiment;

FIG. 7 is a configuration diagram of node mapping information according to the embodiment;

FIG. 8 is a configuration diagram of process/data positional information according to the embodiment;

FIG. 9 is a configuration diagram of related cluster information according to the embodiment;

FIG. 10 is a configuration diagram of shared node candidate information according to the embodiment;

FIG. 11 is a configuration diagram of process policy information according to the embodiment;

DETAILED DESCRIPTION

An embodiment will be described with reference to the drawings. It should be noted that the embodiment described below is not intended to limit the invention as set forth in the accompanying claims and that all of the elements described in the embodiment and combinations thereof are not necessarily essential to solutions proposed by the invention.

Figure 1:
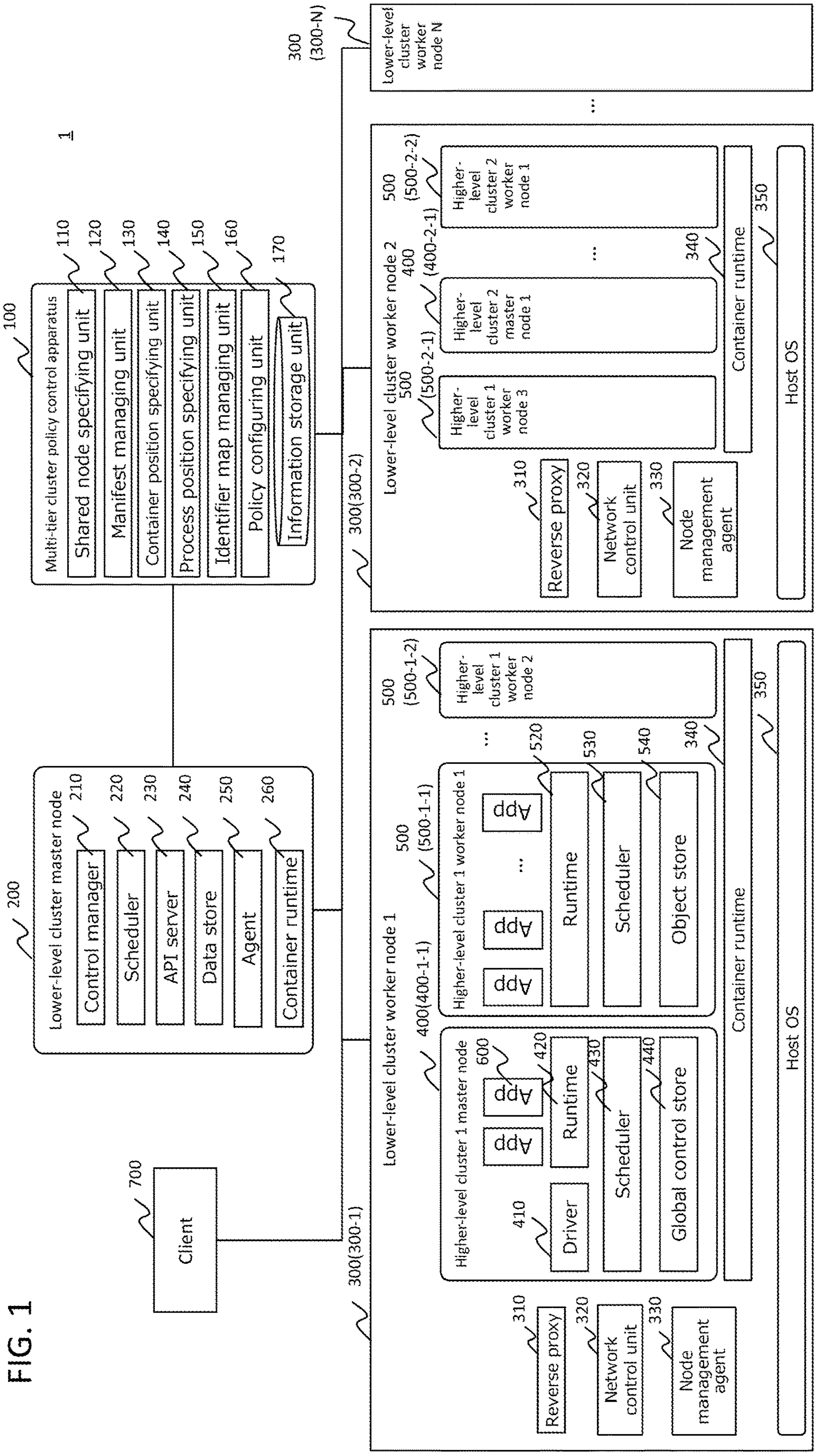
FIG. 1 is an overall configuration diagram of a computer system according to an embodiment.

FIG. 1 is an overall configuration diagram of a computer system according to the embodiment. Note that FIG. 1 illustrates a state where a higher-level cluster (processing cluster) has been deployed and configured on a lower-level cluster, and when a higher-level cluster has not been deployed, the configuration of the higher-level cluster does not exist.

A computer system 1 includes a multi-tier cluster policy control apparatus 100 as an example of the multi-tier cluster control apparatus, a lower-level cluster master node 200, one or more lower-level cluster worker nodes 300 (300-1, 300-2, . . . , 300-N), and a client 700. The multi-tier cluster policy control apparatus 100, the lower-level cluster master node 200, the lower-level cluster worker node 300, and the client 700 are coupled via a computer network. For example, the computer network is a LAN (Local Area Network) and/or a WAN (Wide Area Network) coupled by a communication apparatus such as a router or a switch.

The lower-level cluster master node 200 and the lower-level cluster worker node 300 constitute a lower-level cluster. For example, the lower-level cluster is a container cluster that provides a container and can be configured by Kubernetes or the like.

The lower-level cluster master node 200 is a node that manages the lower-level cluster. For example, the lower-level cluster master node 200 may be configured with a physical server or configured with a VM (virtual machine). The lower-level cluster master node 200 includes a control manager 210, a scheduler 220, an API (Application Programming Interface) server 230, a data store 240, an agent 250, and a container runtime 260.

The control manager 210 specifies a resource usage rate, a communication coupling status, an operational status of a host OS, an operational status of a container, and the like of the lower-level cluster worker node 300 and determines whether or not to run a container, how many containers are to be run, or the like. The scheduler 220 determines the lower-level cluster worker node 300 to run a container. The API server 230 provides the control manager 210, the scheduler 220, the agent 250, a node management agent 330, and the like with data stored in the data store 240. The data store 240 stores configuration information of the lower-level cluster, information on an application system that runs in the container cluster, information of a node (node information), and the like. The agent 250 specifies a state of the host OS of the lower-level cluster master node 200 and requests the container runtime 260 to start or stop a container. The container runtime 260 is an execution environment for running a container and is configured with, for example, a Docker (registered trademark) daemon.

The lower-level cluster worker node 300 is a node that runs a container. For example, the lower-level cluster worker node 300 may be configured with a physical server or configured with a VM (virtual machine). The lower-level cluster worker node 300 includes a reverse proxy 310, a network control unit 320, the node management agent 330, a container runtime 340, and a host OS 350.

The reverse proxy 310 has a function of routing communication to a container to an appropriate container. For example, the reverse proxy 310 is configured with a kube-proxy or the like. The network control unit 320 controls an IP table or the like in order to configure a communication path to a container. For example, the network control unit 320 is configured with a Calico or the like. The node management agent 330 specifies a state of the host OS 350 of the lower-level cluster worker node 300 and requests the container runtime 340 to start or stop a container. The container runtime 340 is an execution environment for running a container and is configured with, for example, a Docker Daemon. The container runtime 340 runs various applications on demand as a container. For example, when a higher-level cluster is to be run as a container, the container runtime 340 runs a container that configures the higher-level cluster. For example, the container runtime 340 runs a higher-level cluster master node 400, a higher-level cluster worker node 500, or the like as a container. The higher-level cluster master node 400 and the higher-level cluster worker node 500 configure a higher-level cluster. For example, the higher-level cluster can be configured with Apache Ray, Kafka, Hadoop (registered trademark), Spark, or the like. The host OS 350 is an operating system that integrally controls the lower-level cluster worker node 300 and is, for example, Linux (registered trademark).

The higher-level cluster master node 400 is a node that manages the higher-level cluster and makes the higher-level cluster to execute a requested source code as an application process. The higher-level cluster master node 400 runs as a container on the container runtime 340 of the lower-level cluster worker node 300. The higher-level cluster master node 400 includes a driver 410, a runtime 420, a scheduler 430, and a global control store 440.

The driver 410 determines the higher-level cluster master node 400 or the higher-level cluster worker node 500 (these nodes will also be referred to as higher-level cluster nodes or processing cluster nodes) for executing an application process 600 (also simply referred to as an application or a process) and allocates the application process 600 to a higher-level cluster node. The runtime 420 is an execution environment of the application process 600. The scheduler 430 executes the allocated application process 600 based on a CPU run by the scheduler 430 and a memory usage rate. The global control store 440 stores configuration information of the higher-level cluster master node 400 and information (identifier) of a higher-level cluster node on which the application process 600 runs.

The higher-level cluster worker node 500 is a node that makes the higher-level cluster to execute the requested source code as the application process 600. The higher-level cluster worker node 500 runs as a container on the container runtime 340 of the lower-level cluster worker node 300. The higher-level cluster worker node 500 includes a runtime 520, a scheduler 530, and an object store 540. The runtime 520 is similar to the runtime 420 and the scheduler 530 is similar to the scheduler 430. The object store 540 is a storage area in which the application process 600 can store data. The application process 600 is a data processing process that can run on a higher-level cluster node. For example, the application process 600 acquires data from a message broker such as Kafka, MQTT (Message Queuing Telemetry Transport), or AMQP (Advanced Message Queuing Protocol), performs processing such as an analysis, and stores a result thereof in the object store 540, a database (not illustrated), or the like. The application process 600 is launched as an application developer transmits an execution request including a source code to the higher-level cluster master node 400, the higher-level cluster master node 400 selects a higher-level cluster node to be executed, and the scheduler 430 (530) on the selected higher-level cluster node is executed on the runtime 420 (520).

For example, the multi-tier cluster policy control apparatus 100 may be configured with a computer such as a PC or a server that includes a processor, a memory, and the like or with a VM. The multi-tier cluster policy control apparatus 100: manages, in association with each other, a higher-level cluster and a lower-level cluster; when deploying the higher-level cluster, based on a requirement of another higher-level cluster (related cluster) in a communication coupling relationship, manages nodes on which a plurality of higher-level clusters can run as a shared node group, and by configuring the shared node group as a policy upon deployment of the higher-level cluster, deploys the higher-level cluster on a nearby node group from the perspective of communication; introduces an execution location when executing a process in the higher-level cluster as a policy; and detects a migration of a higher-level cluster node (container) and updates a policy of the process to reduce an amount of communication between remote nodes.

The multi-tier cluster policy control apparatus 100 includes a shared node specifying unit 110, a manifest managing unit 120, a container position specifying unit 130, a process position specifying unit 140, an identifier map managing unit 150, a policy configuring unit 160, and an information storage unit 170. Here, the shared node specifying unit 110, the manifest managing unit 120, the container position specifying unit 130, the process position specifying unit 140, the identifier map managing unit 150, and the policy configuring unit 160 are functional units that are configured as a processor executes a program (multi-tier cluster control program) stored in a memory.

When a plurality of higher-level clusters are to be deployed to a same lower-level cluster, the shared node specifying unit 110 specifies the lower-level cluster worker node 300 to which each higher-level cluster is deployable based on a requirement of each higher-level cluster, specifies higher-level clusters having a coupling relationship between application processes 600 that run on different higher-level clusters, and specifies a lower-level worker node that satisfies a requirement of the higher-level clusters.

The manifest managing unit 120 manages a manifest for deployment (cluster deployment manifest) for deploying a higher-level cluster to a lower-level cluster. A cluster deployment manifest includes information of such as requirements for deploying a higher-level cluster (for example, a necessary CPU, a memory, necessity (recommended or essential) of a GPU (Graphics Processing Unit)), network requirements such as a UDP to be exposed and a TCP port, and a container image for running the higher-level cluster.

The container position specifying unit 130 specifies the lower-level cluster worker node 300 on which a container configured as the higher-level cluster master node 400 and the higher-level cluster worker node 500 run. The process position specifying unit 140 specifies a higher-level cluster node on which the application process 600 runs.

The identifier map managing unit 150 manages, in association with each other, an identifier of a higher-level cluster node managed by the higher-level cluster master node 400 and a pod name of a higher-level cluster node managed by the lower-level cluster master node 200. Here, a pod name is unique information for identifying one or more containers to be handled as a batch.

The policy configuring unit 160 configures a policy (referred to as a cluster policy) for designating a lower-level cluster worker node that is a deployment destination of a higher-level cluster upon deployment of the higher-level cluster and also configures a policy (referred to as a process policy) for designating a higher-level cluster node that executes the application process 600 in the higher-level cluster.

The information storage unit 170 is an example of a storage apparatus and is a storage area that stores programs and data to be used by the multi-tier cluster policy control apparatus 100. For example, the information storage unit 170 stores a multi-tier cluster control program that configures each functional unit and also stores node mapping information 1400 (refer to FIG. 7), process/data positional information 1500 (refer to FIG. 8), related cluster information 1600 (refer to FIG. 9), shared node candidate information 1700 (refer to FIG. 10), process policy information 1800 (refer to FIG. 11), node information 2100 (refer to FIG. 2), cluster deployment request information 2200 (refer to FIGS. 3 and 4), and a cluster deployment manifest 2300 (refer to FIGS. 5 and 6). Information stored in the information storage unit 170 will be described later.

The client 700 is configured with, for example, a computer such as a PC and receives various instructions from a user who is an application developer or a manager of infrastructure such as a cluster. For example, the client 700 creates cluster deployment request information (refer to FIGS. 3 and 4) based on an instruction from the user and transmits the cluster deployment request information to the lower-level cluster master node 200.

Next, the node information 2100 will be described.

FIG. 2 is a diagram illustrating a configuration example of node information of a lower-level cluster according to the embodiment. FIG. 2 illustrates an example of node information with respect to one node of a lower-level cluster.

The node information 2100 is managed by the lower-level cluster master node 200 and, in the present embodiment, acquired by the multi-tier cluster policy control apparatus 100 from the lower-level cluster master node 200. The node information 2100 is provided so as to correspond to each node of the lower-level cluster master node 200 and the lower-level cluster worker node 300 (lower-level cluster nodes: container cluster nodes).

The node information 2100 includes: a label indicating a management purpose of a corresponding lower-level cluster node (Labels); an annotation indicating supplementary information with respect to the corresponding lower-level cluster node (Annotations); a condition indicating a state of the corresponding lower-level cluster node (Conditions); an address indicating information of a network such as an IP address or a host name (Addresses); a capacity indicating information of a capacity of a CPU, a memory, or the like held by the corresponding lower-level cluster node (Capacity); allocatable indicating information on a surplus CPU, memory, or the like (Allocatable); system information indicating various kinds of information of a system that configures the corresponding lower-level cluster node (System Info), and the like. Since the configuration of the node information 2100 is well known, a further description will be omitted.

Next, the cluster deployment request information 2200 will be described. The cluster deployment request information 2200 is information to be transmitted to the lower-level cluster master node 200 in order to deploy a higher-level cluster to a lower-level cluster and is created using, for example, the client 700 by a user who desires to deploy the higher-level cluster.

FIG. 3 is a diagram illustrating an example of cluster deployment request information according to the embodiment. FIG. 4 is a diagram illustrating another example of cluster deployment request information according to the embodiment. Cluster deployment request information 2200-1 in FIG. 3 is cluster deployment request information when deploying an Apache Ray cluster and cluster deployment request information 2200-2 in FIG. 4 is cluster deployment request information when deploying a Kafka cluster.

The cluster deployment request information 2200 includes: an API version that indicates a version of an API (apiVersion); a kind indicating a kind of a request (kind); metadata (metadata); and specifications (spec). Since API versions and kinds are well known, a detailed description will be omitted.

Specifications include a requirement to be met when deploying a higher-level cluster to a lower-level cluster.

Metadata includes management information for the lower-level cluster to manage the higher-level cluster. Metadata includes an annotation. An annotation includes a key "pool-hetero-stuck" and object format information indicating a requirement with respect to a node of the higher-level cluster (which can be described a requirement with respect to the lower-level cluster node to deploy the higher-level cluster node). The object format information includes a related service (related-services), a node preference (node_preferrence), a cluster size (cluster_size), and resources (resources).

The related service is information indicating one or more related services (services with a relationship of coupling communication (a coupling relationship)) and includes information indicating another higher-level cluster to which an application process deployed to a higher-level cluster is coupled. The related service of the cluster deployment request information 2200-1 illustrated in FIG. 3 indicates that an application deployed to a higher-level cluster Ray Cluster that corresponds to the cluster deployment request information 2200-1 is in a coupling relationship with a Kafka cluster, a Knative cluster, and an Influx cluster. In addition, the related service of the cluster deployment request information 2200-2 illustrated in FIG. 4 indicates that an application deployed to a higher-level cluster Kafka cluster that corresponds to the cluster deployment request information 2200-2 is in a coupling relationship with a Ray cluster, a Knative cluster, and an Influx cluster. Since a Kafka cluster is a cluster that performs PubSub (Publish-Subscribe) and is therefore not directly coupled to an Influx cluster, in the present embodiment, clusters with a communication relationship not only include clusters with a direct coupling relationship with a target higher-level cluster but also include clusters with an indirect coupling relationship. By including clusters with an indirect coupling relationship in this manner, from the perspective of communication distance, clusters with an indirect coupling relationship can also be collectively deployed to a nearby lower-level cluster node.

A node preference is information indicating a preference to be shared by all clusters included in a related service. The node preference can be used to designate whether it is recommended (whether gpu-support is true) or it is essential (whether required is true) that the lower-level cluster worker node 300 to deploy each cluster is mounted with a GPU. Accordingly, for example, since whether or not the GPU is essential can be specified, when a GPU is essential, a target cluster can be appropriately prevented from being deployed to a lower-level cluster worker node not mounted with a GPU.

The cluster size is information indicating a minimum size and a maximum size of a higher-level cluster. The resources include a request that indicates a minimum required amount of resources (CPU, memory, and the like) (request) and a limit that indicates a maximum permissible amount (restricted amount) of resources (limit).

Next, the cluster deployment manifest 2300 will be described. The cluster deployment manifest 2300 is a manifest used to deploy a higher-level cluster to a lower-level cluster. The lower-level cluster master node 200 deploys a higher-level cluster according to the cluster deployment manifest 2300. The cluster deployment manifest 2300 is generated based on the cluster deployment request information 2200 in cluster policy information generation processing (refer to FIG. 13) to be described later.

FIG. 5 is a diagram illustrating an example of a cluster deployment manifest according to the embodiment. FIG. 6 is a diagram illustrating another example of a cluster deployment manifest according to the embodiment. A cluster deployment manifest 2300-1 in FIG. 5 is a cluster deployment manifest when deploying an Apache Ray cluster and a cluster deployment manifest 2300-2 in FIG. 6 is a cluster deployment manifest when deploying a Kafka cluster.

The cluster deployment manifest 2300 is configured such that an affinity (affinity: node specific information) has been added beneath specifications with respect to the cluster deployment request information 2200 illustrated in FIGS. 3 and 4. The cluster deployment manifest 2300-1 is added an affinity 2301-1 and an affinity 2301-2 to the cluster deployment request information 2200-1 and the cluster deployment manifest 2300-2 is added an affinity 2302-1 to the cluster deployment request information 2200-2.

An affinity can include an essential condition (requiredDuringSchedulingIgnoredDuringExecution) and a preferential condition (preferredDuringSchedulingIgnoredDuringExecution) with respect to a node of a lower-level cluster to which a higher-level cluster is to be deployed. A condition is configured with a key-value pair and a key-value pair configured as an essential condition means that matching a key-value pair of a label of the node information 2100 of the node is essential while a key-value pair configured as a preferential condition means that a node matching a key-value pair of a label of the node information 2100 of the node is to be preferentially selected.

For example, in the case of the affinity 2301-1, a higher-level cluster can only be deployed to the lower-level cluster worker node 300 which includes 50acd0ce-9b9a-4438-ab6a-a64f4656165c as a value of a label of the node information 2100 of which a key is pool-hetero-stuck-id, and when such a node exists in plurality, a node of which a key-value pair of a label is a pair made up of gpu-support and true preferentially becomes a deployment destination.

Next, the node mapping information 1400 will be described.

FIG. 7 is a configuration diagram of node mapping information according to the embodiment.

Figure 14:
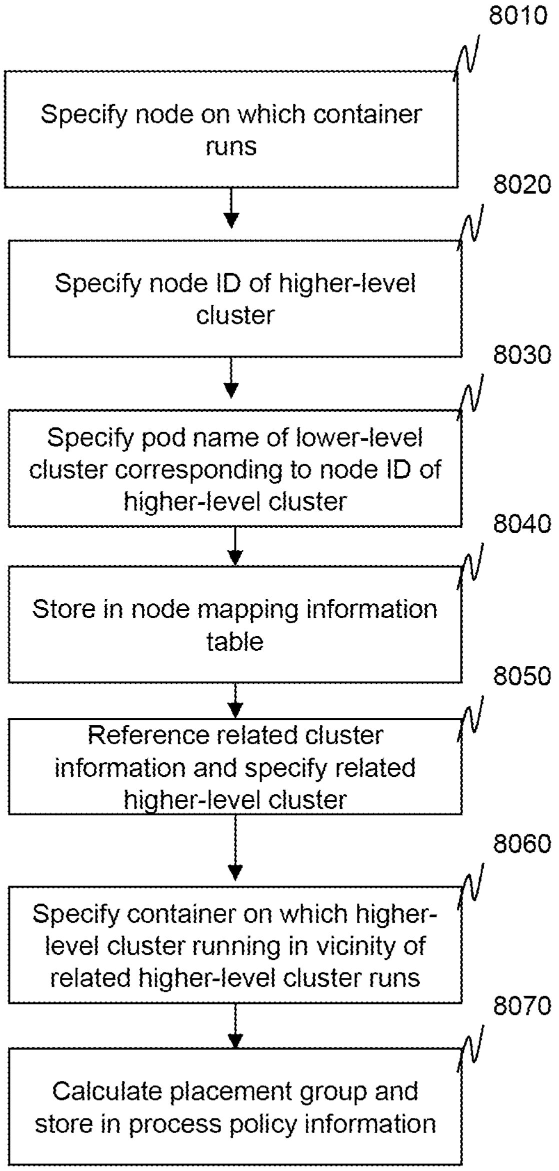
FIG. 14 is a flow chart of process policy information generation processing according to the embodiment.

The node mapping information 1400 is information representing a correspondence relationship between a higher-level cluster node and a pod of a lower-level cluster and is generated in process policy information generation processing (refer to FIG. 14). The node mapping information 1400 enables a pod of a lower-level cluster corresponding to a node of a higher-level cluster to be specified. The node mapping information 1400 stores an entry for each higher-level cluster node. An entry of the node mapping information 1400 includes the fields of a cluster ID (cluster-id) 1401, a cluster node ID (cluster node id) 1402, a machine ID (machine id) 1403, and a pod name (pod name) 1404.

The cluster ID 1401 stores an identifier (a cluster ID) of a higher-level cluster which a higher-level cluster node corresponding to the entry belongs to. For example, the cluster ID is a UUID (Universally Unique Identifier) created by the multi-tier cluster policy control apparatus 100.

The cluster node ID 1402 stores an identifier (a cluster node ID) of a higher-level cluster node corresponding to the entry. The cluster node ID is an identifier of a higher-level cluster node created and managed by the higher-level cluster master node 400.

The machine ID 1403 stores an identifier (a machine ID) of a lower-level cluster worker node. The machine ID is an identifier of a lower-level cluster worker node created and managed by the lower-level cluster master node 200 and corresponds to a machine ID (Machine ID) beneath system information of the node information 2100.

The pod name 1404 stores a name (pod name) of a pod that includes the higher-level cluster node corresponding to the entry.

Next, the process/data positional information 1500 will be described.

FIG. 8 is a configuration diagram of process/data positional information according to the embodiment.

Figure 15:
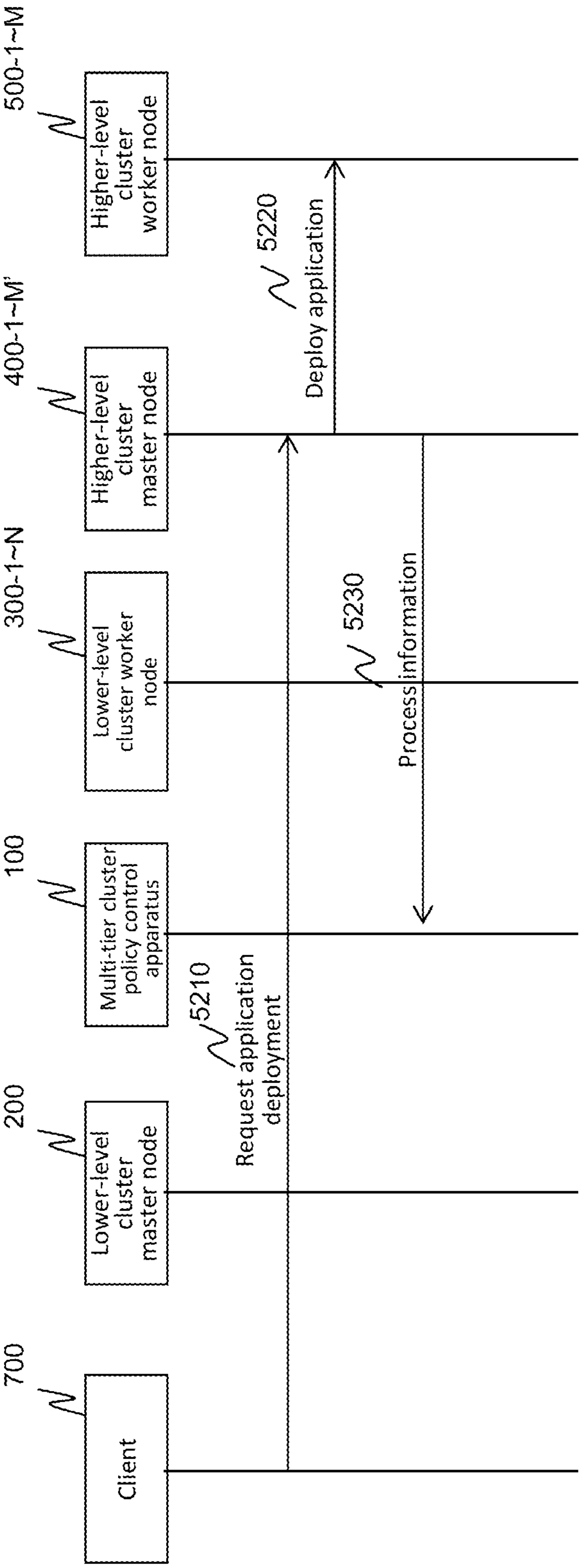
FIG. 15 is a sequence diagram of application deployment processing according to the embodiment.

The process/data positional information 1500 is information representing a correspondence relationship between a process of a higher-level cluster and a higher-level cluster node and is generated in step 5230 in FIG. 15. The process/data positional information 1500 enables which node of a higher-level cluster a process of the higher-level cluster is executed in to be specified. The process/data positional information 1500 has an entry for each process. An entry of the process/data positional information 1500 includes fields of a cluster ID (cluster-id) 1501, a process ID (process id) 1502, and a cluster node ID (cluster node id) 1503.

The cluster ID 1501 stores an identifier (a cluster ID) of a higher-level cluster in which a process corresponding to the entry is executed. The process ID 1502 stores an identifier (process ID) of the process which corresponds to the entry. The process ID is an identifier of the application process 600 deployed to a higher-level cluster created and managed by the higher-level cluster master node 400. The cluster node ID 1503 stores an identifier (a cluster node ID) of a node of a higher-level cluster in which the process 600 corresponding to the entry is executed. The cluster node ID is an identifier of a higher-level cluster node created and managed by the higher-level cluster master node 400.

Next, the related cluster information 1600 will be described.

FIG. 9 is a configuration diagram of related cluster information according to the embodiment.

Figure 13:
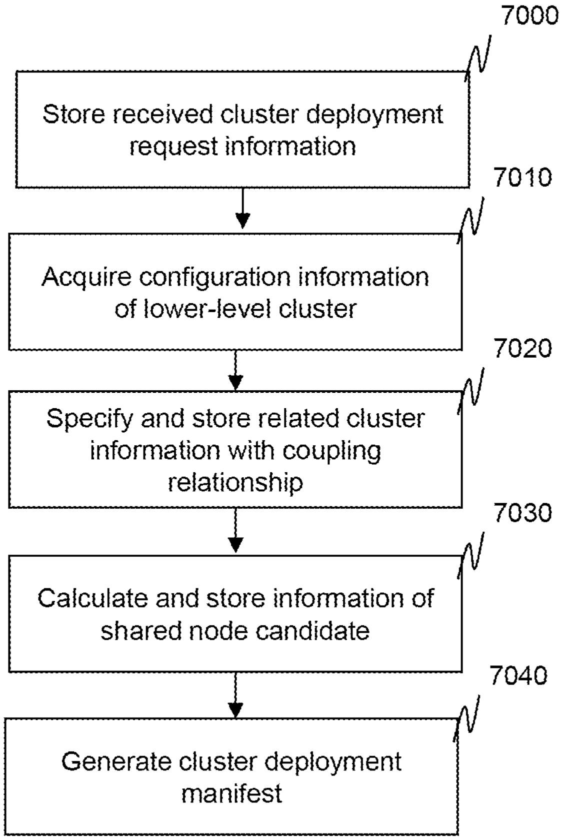
FIG. 13 is a flow chart of cluster policy information generation processing according to the embodiment.

The related cluster information 1600 is information for managing a higher-level cluster (related cluster) which is related (which has a coupling relationship) and which is generated in step 7020 in FIG. 13. The related cluster information 1600 enables another higher-level cluster to which an application process that runs on the higher-level cluster is coupled to be specified. The related cluster information 1600 has an entry for each cluster. An entry of the related cluster information 1600 includes fields of a pool ID (pool-id) 1601, a cluster ID (cluster-id) 1602, and a related cluster ID (related cluster id) 1603.

The pool ID stores an identifier (a pool ID) indicating a higher-level cluster group (a pool) including a higher-level cluster related to a higher-level cluster corresponding to the entry. For example, the pool ID is a UUID created by the multi-tier cluster policy control apparatus 100. The cluster ID 1602 stores a cluster ID of the higher-level cluster corresponding to the entry. The related cluster ID 1603 stores a cluster ID of another higher-level cluster related to the higher-level cluster corresponding to the entry or, in other words, another higher-level cluster to which an application process that runs on the higher-level cluster corresponding to the entry is coupled.

Next, the shared node candidate information 1700 will be described.

FIG. 10 is a configuration diagram of shared node candidate information according to the embodiment.

The shared node candidate information 1700 is information for managing a node of a lower-level cluster that conforms to the requirements of a higher-level cluster group (pool) and is generated in step 7040 in FIG. 13. The shared node candidate information 1700 enables a node conforming to requirements of a plurality of higher-level cluster in a coupling relationship to be specified. The shared node candidate information 1700 stores an entry for each pool. An entry of the shared node candidate information 1700 includes fields of a pool ID (pool-id) 1701 and a machine ID (machine id) 1702.

The pool ID 1701 stores a pool ID indicating a pool that is a related higher-level cluster group. The machine ID 1702 stores a machine ID of a lower-level cluster worker node 300 that can be allocated to a pool corresponding to the entry.

Next, the process policy information 1800 will be described.

FIG. 11 is a configuration diagram of process policy information according to the embodiment.

The process policy information 1800 is information for managing a correspondence relationship between a cluster name and a placement group and which is generated in step 8070 in FIG. 14. The process policy information 1800 enables, when an application developer deploys a source code to a cluster, which placement group is to be designated with respect to the cluster name to be specified. The process policy information 1800 stores an entry for each higher-level cluster. An entry of the process policy information 1800 includes fields of a cluster ID 1801, a cluster name (Cluster name) 1802, a cluster node ID 1803, and a placement group (Placement-group) 1804.

The cluster ID 1801 stores a cluster ID of a higher-level cluster corresponding to the entry. The cluster name 1802 stores a human-readable name (cluster name) of the higher-level cluster corresponding to the entry. The cluster name may be a name designated by the user for a related service in an annotation in the cluster deployment request information 2200. The cluster node ID 1803 stores a cluster node ID of the higher-level cluster corresponding to the entry. The placement group 1804 stores identification information (placement group name) indicating a placement group (a node candidate group of a deployment destination) to be designated when an application developer deploys a source code of an application. The placement group name may be a UUID or a human-readable character string created by the multi-tier cluster policy control apparatus 100.

Next, processing operations of the computer system 1 will be described.

Figure 12:
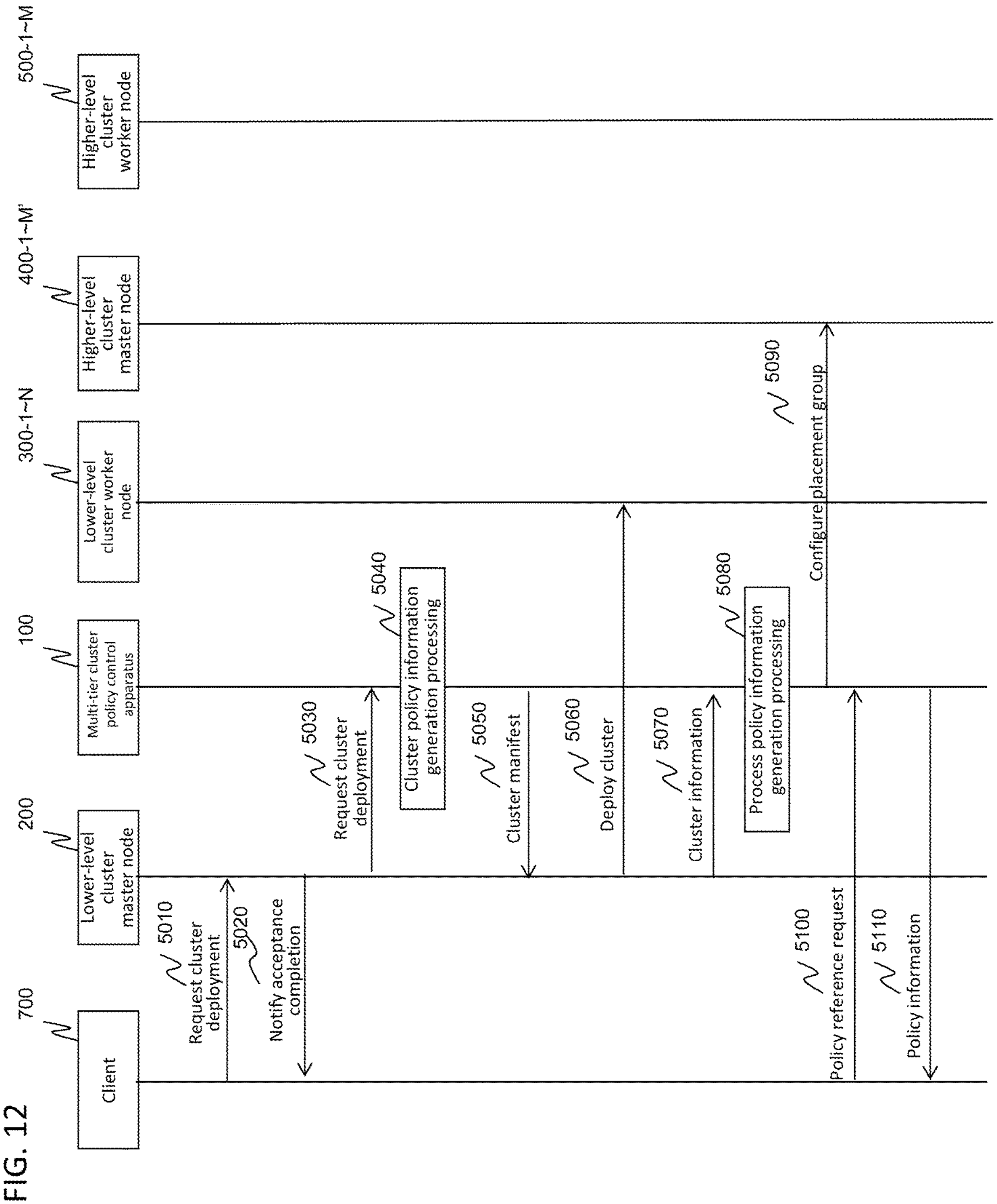
FIG. 12 is a sequence diagram of cluster deployment processing according to the embodiment.

FIG. 12 is a sequence diagram of cluster deployment processing according to the embodiment.

For example, cluster deployment processing is started when, in the client 700, the user creates the cluster deployment request information 2200 with respect to a higher-level cluster to be deployed and issues an instruction for cluster deployment. Note that an annotation of the cluster deployment request information 2200 includes various requirements corresponding to a cluster to be deployed. In step 5010, the client 700 transmits the created cluster deployment request information 2200 to the lower-level cluster master node 200 of a lower-level cluster to which the higher-level cluster is to be deployed.

In step 5020, upon receiving the cluster deployment request information 2200, the lower-level cluster master node 200 transmits an acceptance completion notification to the client 700.

In step 5030, the lower-level cluster master node 200 transmits the cluster deployment request information 2200 to the multi-tier cluster policy control apparatus 100.

In step 5040, upon receiving the cluster deployment request information 2200, the multi-tier cluster policy control apparatus 100 executes cluster policy information generation processing (refer to FIG. 13) for generating the cluster deployment manifest 2300 based on the cluster deployment request information 2200. Details of the cluster policy information generation processing will now be described.

FIG. 13 is a flow chart of cluster policy information generation processing according to the embodiment.

In step 7000, the shared node specifying unit 110 stores the cluster deployment request information 2200 received in step 5030. Specifically, the shared node specifying unit 110 creates a UUID (cluster ID) of a cluster corresponding to the information, associates the cluster ID with the cluster deployment request information 2200, and stores as a cluster request information table.

In step 7010, the shared node specifying unit 110 acquires, from the lower-level cluster master node 200, the node information 2100 of all of or a plurality of nodes that configure a lower-level cluster.

In step 7020, the shared node specifying unit 110 specifies information of a cluster (related cluster) which is related (which has a coupling relationship of communication) and stores the information as the related cluster information 1600. Specifically, using the cluster ID issued in step 7000 as a key, the shared node specifying unit 110 references the cluster request information table and specifies all of the names of name (referred to as cluster name) beneath metadata and names of clusters (related clusters) listed in related service (related-services) beneath annotation beneath metadata. Next, the shared node specifying unit 110 specifies all of the IDs (related cluster IDs) of related clusters of which cluster names in the cluster request information table are the specified related cluster names. Here, when the cluster deployment request information 2200 of the related cluster name does not exist in the cluster request information table, since this indicates that storage processing of the cluster deployment request information 2200 corresponding to the related cluster has not yet been performed, the processing does not advance to the subsequent steps but waits for the cluster deployment request information 2200 corresponding to the related cluster to be registered in the cluster request information table.

The shared node specifying unit 110 checks whether or not the cluster ID or the related cluster ID exists in the cluster ID or the related cluster ID of the related cluster information 1600 and, if so, specifies the pool ID but, if not, creates a UUID as a new pool ID that corresponds to the group of clusters (pool). Next, the shared node specifying unit 110 checks whether or not a combination of the pool ID, the cluster ID, and the related cluster ID exists in the related cluster information 1600 and, if not, newly stores an entry of these pieces of information in the related cluster information 1600.

In step 7030, the shared node specifying unit 110 calculates (specifies) a candidate of a shared lower-level node (shared node candidate) to which the cluster and the related cluster are to be deployed and stores information of the shared node candidate in the shared node candidate information 1700. Respectively using the related cluster ID specified in step 7020 and the cluster ID specified in step 7000 as keys, the shared node specifying unit 110 references the cluster request information table and specifies a node preference beneath annotation beneath metadata in the cluster deployment request information 2200 which correspond to the related cluster ID and the cluster ID. Next, the shared node specifying unit 110 references the node information 2100 of all nodes, specifies the node information 2100 in which a key value included in the specified node preference is included in the label, and specifies a machine ID beneath system information in the node information 2100. Next, when a pair formed of the pool ID specified in step 7020 and the specified machine ID does not exist, the shared node specifying unit 110 adds the pool ID and the machine ID to the shared node candidate information 1700 as a new entry.

In step 7040, the manifest managing unit 120 generates the cluster deployment manifest 2300. Specifically, using the cluster ID specified in step 7000 as a key, the manifest managing unit 120 references the cluster deployment request information 2200 in the cluster request information table. Next, the manifest managing unit 120 creates the cluster deployment manifest 2300 by adding an affinity to the referenced cluster deployment request information 2200. The affinity includes a node affinity. The manifest managing unit 120 additionally writes an essential condition (requiredDuringSchedulingIgnoredDuringExecution) and a preferential condition (preferredDuringSchedulingIgnoredDuringExecution) in the node affinity, writes "pool-hetero-stuck-id" as a key in a match expression (matchExpressions) beneath a node selection term (nodeSelectorTerms) beneath the essential requirement, and writes the pool ID specified in step 7020 as a value. When there is another essential condition in the node preference of the cluster deployment request information 2200, the manifest managing unit 120 writes a corresponding key and a corresponding value beneath the essential condition. In addition, when there is a preferential condition in the node preference of the cluster deployment request information 2200, the manifest managing unit 120 writes a corresponding key and a corresponding value beneath the preferential condition. Furthermore, when pool-hetero-stuck-ids does not exist as a key in a label of the node information 2100, the manifest managing unit 120 adds pool-hetero-stuck-ids, and when the pool ID comprehended in step 7020 does not exist in a value with respect to the same key, the manifest managing unit 120 adds the pool ID. According to this step, for example, the cluster deployment manifest 2300-1 illustrated in FIG. 5 is created based on the cluster deployment request information 2200-1 illustrated in FIG. 3, and the cluster deployment manifest 2300-2 illustrated in FIG. 6 is created with respect to the cluster deployment request information 2200-2 illustrated in FIG. 4.

Returning to the description of FIG. 12, in step 5050, the multi-tier cluster policy control apparatus 100 transmits the generated cluster deployment manifest 2300 to the lower-level cluster master node 200.

In step 5060, based on the received cluster deployment manifest 2300, the lower-level cluster master node 200 transmits a request for deployment of a higher-level cluster to the lower-level cluster worker node 300.

In step 5070, the lower-level cluster master node 200 transmits information of the deployed higher-level cluster to the multi-tier cluster policy control apparatus 100. In this case, the information of the deployed higher-level cluster includes a pod name, a container name, and a machine ID of the lower-level cluster worker node 300 on which the container runs. Note that the information of the deployed higher-level cluster need not be proactively conveyed by the lower-level cluster master node 200 to the multi-tier cluster policy control apparatus 100 and, for example, the multi-tier cluster policy control apparatus 100 may constantly monitor (for example, by polling, watching with a streaming connection of gRPC, or the like) an API server of the lower-level cluster master node 200 and detect the information of the deployed higher-level cluster.

In step 5080, the multi-tier cluster policy control apparatus 100 executes process policy information generation processing (FIG. 14) for generating process policy information. Details of the process policy information generation processing will now be described.

FIG. 14 is a flow chart of process policy information generation processing according to the embodiment.

In step 8010, the container position specifying unit 130 calls an API of the lower-level cluster master node 200 and specifies a machine ID of a node on which a container runs.

In step 8020, the container position specifying unit 130 calls an API of the higher-level cluster master node 400 and specifies a node ID of a higher-level cluster corresponding to the container.

In step 8030, the container position specifying unit 130 specifies a pod name of a lower-level cluster corresponding to the node ID of the higher-level cluster. Here, the node ID of the higher-level cluster node and the pod name of the lower-level cluster are respectively independent and are not managed in association with each other. While there are a plurality of methods of specifying a pod name corresponding to a node ID, for example, there is a method of using an IP address of a container included in a pod corresponding to the pod name. With this method, first, the container position specifying unit 130 acquires an IP address of each container from an API of the lower-level cluster master node 200 and acquires an IP address of a container corresponding to the pod name. Next, the container position specifying unit 130 executes a source code for acquiring an IP address and a node ID in a node of the higher-level cluster node and acquires a node ID and an IP address. Next, the container position specifying unit 130 specifies a pod name corresponding to a same IP address as the IP address of the node ID of a node of the higher-level cluster.

In step 8040, the container position specifying unit 130 stores a correspondence relationship between the specified node ID of the higher-level cluster and the specified pod name in the node mapping information 1400. Specifically, the container position specifying unit 130 adds, to the node mapping information 1400, an entry in which the cluster ID received in step 5070, the node ID specified in step 8020, the machine ID specified in step 8010, and the pod name specified in step 8030 have been respectively stored in the fields of cluster ID, cluster node ID, machine ID, and pod name.

In step 8050, the shared node specifying unit 110 references related cluster information and specifies a related higher-level cluster. Specifically, the shared node specifying unit 110 references the related cluster information 1600, specifies a related cluster ID corresponding to the cluster ID of the cluster information received in step 5070, and references the cluster request information table using the related cluster ID as a key to specify cluster information of a higher-level cluster with the related cluster ID.

In step 8060, the identifier map managing unit 150 specifies a container of a higher-level cluster that runs in a vicinity (a predetermined range) of a related higher-level cluster (related cluster) specified in step 8050. Specifically, the identifier map managing unit 150 calls an API of a lower-level cluster with respect to the related cluster ID specified in step 8050 and acquires the node information 2100 of the lower-level cluster on which a node (container) of the cluster and the related cluster runs. Next, the identifier map managing unit 150 specifies an availability zone (referred to as an availability zone of a cluster) configured in an availability zone (availability-zone) beneath label in the node information 2100 of a node of a lower-level cluster on which all nodes of the higher-level cluster run. Next, the identifier map managing unit 150 specifies an availability zone (referred to as an availability zone of a related cluster) beneath label in node information of a node of a lower-level cluster on which all containers of the related cluster run. Next, the identifier map managing unit 150 specifies a node (referred to as a neighbor node) of which an availability zone of a related cluster is the same as the availability zone of the cluster. Next, the identifier map managing unit 150 references the node mapping information 1400 and, using a pod name of a higher-level cluster running on the specified neighbor node as a key, specifies a cluster node ID. The identifier map managing unit 150 performs these processing steps on all related clusters and stores a set of a cluster ID of a higher-level cluster, a related cluster name, and a cluster node ID.

In step 8070, the identifier map managing unit 150 issues a UUID or a human-readable and unique character string as a placement group name and stores the placement group name in the process policy information 1800. Specifically, the identifier map managing unit 150 adds, to the process policy information 1800, an entry containing the cluster ID, the related cluster name, the cluster node ID, and the placement group name stored in step 8060.

Returning to the description of FIG. 12, in step 5090, the multi-tier cluster policy control apparatus 100 configures the process policy information 1800 to the higher-level cluster master node 400 of the higher-level cluster.

In step 5100, in the client 700, when an instruction to reference a policy is issued by the user, the client 700 transmits a policy reference request to the multi-tier cluster policy control apparatus 100. For example, the policy reference request includes a cluster name (processing cluster identification information) of another higher-level cluster used in the higher-level cluster.

In step 5110, the multi-tier cluster policy control apparatus 100 references the process policy information 1800 using another received higher-level cluster name and sends back the placement group name associated with the other cluster name to the client 700 of a request source. Accordingly, the user can specify a placement group name corresponding to the higher-level cluster.

As described above, according to the cluster deployment processing, the cluster deployment manifest 2300 that enables a plurality of related higher-level clusters to be appropriately placed on a same lower-level node and a plurality of related higher-level clusters can be appropriately placed on a same lower-level node.

Next, a processing operation of application deployment processing will be described.

FIG. 15 is a sequence diagram of application deployment processing according to the embodiment.

For example, application deployment processing is started when, in the client 700, the user creates application deployment request information with respect to an application to be deployed and issues an instruction for application deployment. The application deployment request information includes a source code to be executed, requirements such as a necessary CPU and a memory, and a placement group name. In step 5210, the client 700 transmits the application deployment request information to the higher-level cluster master node 400.

In step 5220, the higher-level cluster master node 400 transmits the source code to a node satisfying requirements among the higher-level cluster worker nodes 500 included in the placement group with the received placement group name and requests the source code to be executed as an application process.

In step 5230, the multi-tier cluster policy control apparatus 100 receives a cluster ID of a higher-level cluster, a process ID of an application, and a node ID of a higher-level cluster node on which the application process runs as process information and stores the process information in the process/data positional information 1500. Note that the information need not be proactively conveyed by the higher-level cluster master node 400 to the multi-tier cluster policy control apparatus 100 and the multi-tier cluster policy control apparatus 100 may constantly monitor (for example, by polling, watching with a streaming connection of gRPC, or the like) the higher-level cluster master node 400 and detect the information.

Due to the application deployment processing, communication can be localized by causing a process of a higher-level cluster to run in a vicinity of a related cluster, an amount of communication between remote nodes can be reduced, and a communication cost between the remote nodes can be reduced.

Next, a processing operation of container migration processing will be described.

Figure 16:
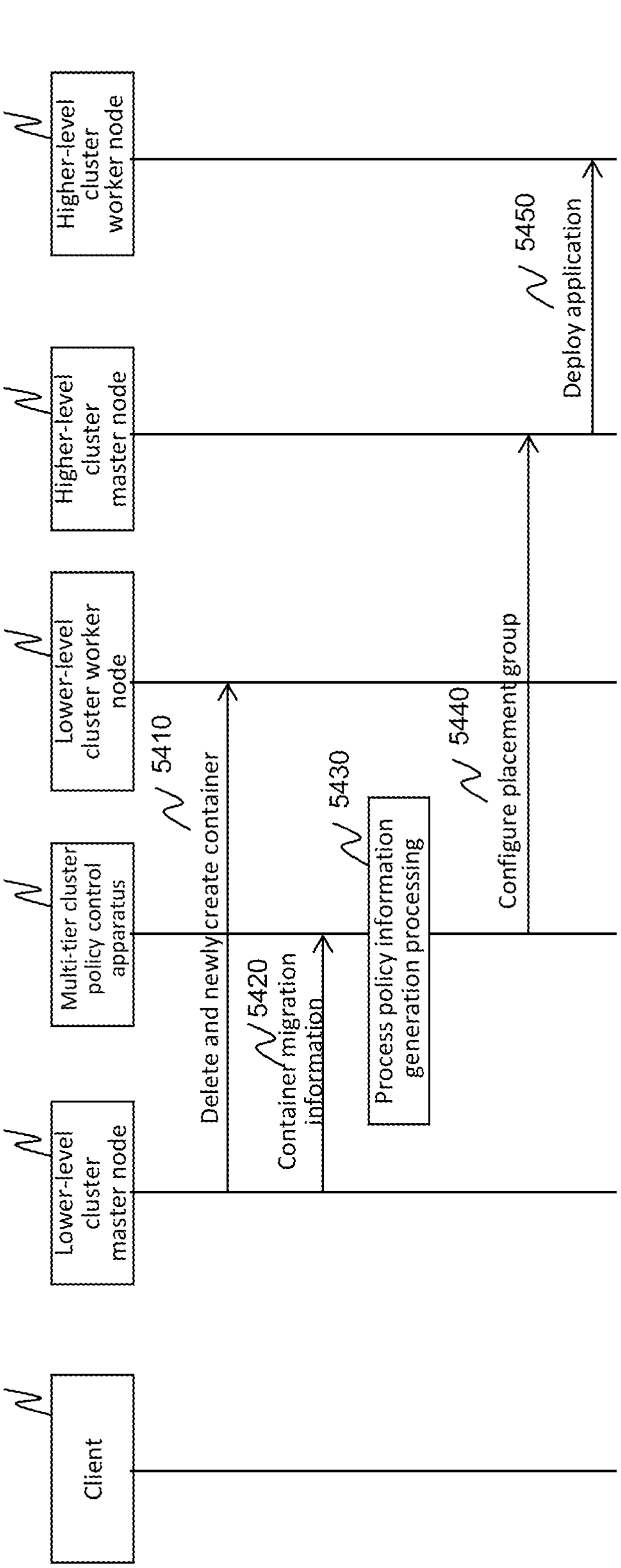
FIG. 16 is a sequence diagram of container migration processing according to the embodiment.

FIG. 16 is a sequence diagram of container migration processing according to the embodiment.

Note that container migration does not actually mean that a container is to be moved but means that an old container is to be deleted and a new container is to be created on a different lower-level cluster worker node 300. When a container is stateful, generally, since a volume for the container to store data is mounted and a same volume as the old container is to be mounted for the new container, container migration is equivalent to restarting the container or, in other words, restarting a node of a higher-level cluster from the perspective of a layer of the container (layer of the higher-level cluster). On the other hand, the new container is created in a node with a low usage rate of computation resources among lower-level cluster worker nodes.

For example, container migration processing is executed when the lower-level cluster master node 200 receives a request from the user to delete an old container, when a failure occurs in the lower-level cluster worker node 300 on which the old container runs, when a shortage of computation resources occurs in a lower-level cluster on which the old container runs, and the like.

In step 5410, the lower-level cluster master node 200 deletes the old container from the lower-level cluster worker node 300 and creates a new container in another lower-level cluster worker node 300.

In step 5420, the multi-tier cluster policy control apparatus 100 acquires information (container migration information) to the effect that a point of operation of the container has changed from the lower-level cluster master node 200. Note that the container migration information need not be proactively conveyed by the lower-level cluster master node 200 to the multi-tier cluster policy control apparatus 100 and, for example, the multi-tier cluster policy control apparatus 100 may constantly monitor (for example, by polling, watching with a streaming connection of gRPC, or the like) an API server of the lower-level cluster master node 200 and detect the container migration information.

In step 5430, the multi-tier cluster policy control apparatus 100 executes process policy information generation processing (FIG. 14) and generates process policy information 1800.

In step 5440, the multi-tier cluster policy control apparatus 100 transmits process policy information including a placement group name to the higher-level cluster master node 400.

In step 5450, the higher-level cluster master node 400 transmits the source code to a node satisfying requirements among the higher-level cluster worker nodes 500 included in the received process policy information and requests the source code to be executed as an application process.

According to the container migration processing, a process of a higher-level cluster can be run in a vicinity of a related cluster even when a container is deleted and newly created and, due to communication being localized, an amount of communication between remote nodes can be reduced, and communication cost between the remote nodes can be reduced.

It is to be understood that the present invention is not limited to the embodiment described above and that various modifications can be made to the invention without departing from the spirit and scope thereof.

For example, a part of or all of the processing performed by the processor in the embodiment described above may be performed by a hardware circuit. Furthermore, the programs in the embodiment described above may be installed from a program source. The program source may be a program distribution server or a recording medium (for example, a portable non-transitory computer readable medium).

What is claimed is:

1. A multi-tier cluster control apparatus controlling a plurality of processing clusters to run on a container cluster, the multi-tier cluster control apparatus comprising a processor, the processor being configured to:

accept, when deploying the processing clusters, with respect to each of the plurality of processing clusters, deployment request information including a requirement for a processing cluster node that configures the processing cluster and a designation of a related cluster, which is another processing cluster having a coupling relationship with the processing cluster;

specify, based on the requirement for the processing cluster node and a requirement for a processing cluster node that configures the related cluster, one or more container cluster nodes, which are a node of a container cluster that conforms to the requirements;

generate a cluster deployment manifest incorporating node specific information with affinity constraints specifying essential conditions and preferential conditions for node selection;

transmit the cluster deployment manifest to the container cluster to deploy the processing cluster on container cluster nodes within a same availability zone as the related cluster;

specify one or more placement groups, which are groups of processing cluster nodes that run on a container cluster node within a predetermined range from a container cluster node on which the processing cluster node of the processing cluster and the processing cluster node of the related cluster run; and transmit information on the specified placement group to the processing cluster as process policy information for determining a processing cluster node to deploy a process.

2. The multi-tier cluster control apparatus according to claim 1, wherein the processor is configured to incorporate the node specific information into a manifest to comply with when the container cluster deploys the processing cluster and transmit the manifest to the container cluster.

3. The multi-tier cluster control apparatus according to claim 1, wherein the requirement for the processing cluster node includes an essential condition that is a condition to be essential and a preferential condition that is a non-essential but a prioritized condition, and the processor is configured to specify, with respect to container cluster nodes that satisfy the essential condition for the processing cluster node and a processing cluster node that configures the related cluster, one or more container cluster nodes, which are container cluster nodes that conform to the requirements while prioritizing container cluster nodes that satisfy the preferential requirement.

4. The multi-tier cluster control apparatus according to claim 1, wherein the processor is configured to:

specify, when a change of a container cluster node where the processing cluster node is to run is detected, one or more placement groups, which are groups of processing cluster nodes that run on a container cluster node within a predetermined range from a container cluster node on which the processing cluster of the processing cluster node and the processing cluster node of the related cluster run; and transmit information of the specified placement group to the processing cluster as information for determining, when deploying a process to the processing cluster, a processing cluster node to deploy the process.

5. The multi-tier cluster control apparatus according to claim 1, wherein the container cluster node within the predetermined range is a container cluster node belonging to a same availability zone.

6. The multi-tier cluster control apparatus according to claim 1, wherein the processor is configured to:

cause a storage apparatus to store information of the placement group; and receive processing cluster identification information that indicates a predetermined processing cluster from a predetermined request source and transmit, to the request source, a placement group name to which a processing cluster node of the processing cluster indicated by the processing cluster identification information belongs.

7. The multi-tier cluster control apparatus according to claim 1, wherein the processor is configured to store node mapping information associating a cluster node identifier of the processing cluster node with a pod name of the container cluster, wherein the pod name is unique information for identifying one or more containers to be handled as a batch.

8. The multi-tier cluster control apparatus according to claim 1, wherein the processor is configured to call an application programming interface of a master node of the container cluster to specify a machine identifier of a container cluster node on which a container runs.

9. The multi-tier cluster control apparatus according to claim 1, wherein the processor is configured to call an application programming interface of a master node of the processing cluster to specify a node identifier of the processing cluster corresponding to a container.

10. The multi-tier cluster control apparatus according to claim 1, wherein the processor is configured to specify a pod name of the container cluster corresponding to a node identifier of the processing cluster by matching an IP address of a container included in a pod with an IP address acquired by executing source code in a node of the processing cluster.

11. The multi-tier cluster control apparatus according to claim 1, wherein the affinity constraints include a match expression specifying a pool identifier as a value for a key in a node selection term, wherein the pool identifier indicates a group of processing clusters having the coupling relationship.

12. The multi-tier cluster control apparatus according to claim 1, wherein the container cluster is a Kubernetes container cluster, and the cluster deployment manifest is a Kubernetes manifest including node affinity specifications.

13. The multi-tier cluster control apparatus according to claim 1, wherein the processing cluster is configured with at least one of Apache Ray, Kafka, Hadoop, or Spark.

14. The multi-tier cluster control apparatus according to claim 1, wherein the processor is configured to store related cluster information associating a pool identifier indicating a group of related processing clusters, a cluster identifier of the processing cluster, and a related cluster identifier of the related cluster.

15. The multi-tier cluster control apparatus according to claim 1, wherein the processor is configured to store shared node candidate information associating a pool identifier indicating a group of related processing clusters with a machine identifier of a container cluster node that can be allocated to the group.

16. The multi-tier cluster control apparatus according to claim 1, wherein the processor is configured to monitor an application programming interface server of a master node of the container cluster to detect deployment of the processing cluster and acquire a pod name, a container name, and a machine identifier of a container cluster node on which a container runs.

17. The multi-tier cluster control apparatus according to claim 1, wherein the processor is configured to detect a migration of a container from a first container cluster node to a second container cluster node, and in response to detecting the migration, update the placement groups based on the second container cluster node.

18. The multi-tier cluster control apparatus according to claim 1, wherein the processor is configured to reduce an amount of communication between remote container cluster nodes by deploying the processing cluster and the related cluster on container cluster nodes within the same availability zone.

19. A multi-tier cluster control method by a multi-tier cluster control apparatus controlling a plurality of processing clusters to run on a container cluster, the method comprising, the multi-tier cluster control apparatus:

accepts, when deploying the processing clusters, with respect to each of the plurality of processing clusters, deployment request information including a requirement for a processing cluster node that configures the processing cluster and a designation of a related cluster, which is another processing cluster having a coupling relationship with the processing cluster;

specifies, based on the requirement for the processing cluster node and a requirement for a processing cluster node that configures the related cluster, one or more container cluster nodes, which are a node of a container cluster that conforms to the requirements;

generates a cluster deployment manifest incorporating node specific information with affinity constraints specifying essential conditions and preferential conditions for node selection;

transmits the cluster deployment manifest to the container cluster to deploy the processing cluster on container cluster nodes within a same availability zone as the related cluster;

specifies one or more placement groups, which are groups of processing cluster nodes that run on a container cluster node within a predetermined range from a container cluster node on which the processing cluster node of the processing cluster and the processing cluster node of the related cluster run; and transmits information on the specified placement group to the processing cluster as information for determining a processing cluster node to deploy a process.

20. A non-transitory computer readable medium storing a multi-tier cluster control program for causing a computer to execute processing related to control of a plurality of processing clusters to run on a container cluster, the multi-tier cluster control program causing a computer to function so as to:

accept, when deploying the processing clusters, with respect to each of the plurality of processing clusters, deployment request information including a requirement for a processing cluster node that configures the processing cluster and a designation of a related cluster, which is another processing cluster having a coupling relationship with the processing cluster;

specify, based on the requirement for the processing cluster node and a requirement for a processing cluster node that configures the related cluster, one or more container cluster nodes, which are a node of a container cluster that conforms to the requirements;

generate a cluster deployment manifest incorporating node specific information with affinity constraints specifying essential conditions and preferential conditions for node selection;

transmit the cluster deployment manifest to the container cluster to deploy the processing cluster on container cluster nodes within a same availability zone as the related cluster;

specify one or more placement groups, which are groups of processing cluster nodes that run on a container cluster node within a predetermined range from a container cluster node on which the processing cluster node of the processing cluster and the processing cluster node of the related cluster run; and transmit information on the specified placement group to the processing cluster as information for determining a processing cluster node to deploy a process.

* * * * *